United States Patent Office 3,470,995
Patented Oct. 7, 1969

3,470,995
CONVEYOR DEVICES IN PACKAGING MACHINES
Paul Kühnle, Winnenden, and Fritz Gaukler, Stuttgart-Feuerbach, Germany, assignors to Fr. Hesser Maschinenfabrik-Aktiengesellschaft, Stuttgart-Bad Cannstatt, Germany, a corporation of Germany
Filed Oct. 2, 1967, Ser. No. 672,104
Claims priority, application Germany, Oct. 13, 1966, H 60,753
Int. Cl. B65g 15/00, 17/00
U.S. Cl. 198—19   8 Claims

ABSTRACT OF THE DISCLOSURE

A device for conveying packages in a packaging machine comprises a chain of linked and relatively-hinging elements with the wall-forming parts of package holders rigidly connected to them. At a point along the conveyor path at which it is required to temporarily release a package, for example for weighing, means are provided to thrust against the relevant chain elements, so pivoting them, and the holder wall parts carried by them, relatively to one another to release the package concerned.

---

Figure 1:
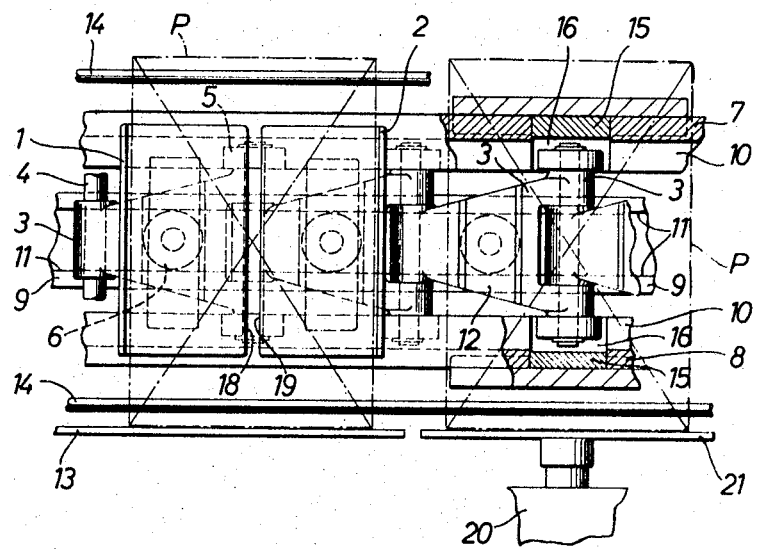

This invention relates to a conveyor device, in a packaging machine, of the kind comprising a chain which is intermittently movable and is provided with package holders. Each holder comprises at least two holder wall parts which are secured to the conveyor chain, and are movable relatively to one another so that the object held in the holder can be temporarily released from the walls of the holder, advantageously on to a weighing device which is arranged in the conveyor system.

A prior form of conveyor device of this kind has holders which enclose the packages from three sides and each comprises two angled holder walls which are displaceably mounted on the chain of the conveyor device in such a way that the holder walls can be pivoted away or retracted from the packages during rest periods in the conveyor travel. The necessary technical outlay to provide for the displaceable mounting of the holder walls on the conveyor chains, and for the locking mechanisms which are required for each holder wall to hold them against displacement during normal travel is, however, comparatively great and also increases the mass of the circulating chain.

In order to avoid these difficulties, in the present invention each of the relatively movable holder wall parts in the assembly is rigidly connected to one of the elements of the conveyor chain, and a control device is provided, at a point along the path of travel of the conveyor where the successively-arriving packages are to be released, to deflect the chain elements, and with them the associated holder wall parts, from the normal position required for conveyance of the packages, during the arrest of the conveyor chain at this point.

In one particular form of construction of the device according to the invention, the elements of the chain are relatively movable about vertical axes and are operable in such a way they can be pivoted apart by a predetermined amount and, directly thereafter, can be retracted part of this amount.

In accordance with a further feature of the invention the holders may comprise associated wall parts of angled formation which are connected to chain elements arranged directly following one another, or are connected to the chain elements so as to leave an empty element between those to which the wall parts are connected.

In another embodiment of the invention, each holder comprises three flat wall parts which are arranged in U-formation, and are each connected to an individual element of the conveyor chain.

In pursuance of a further feature of the invention it is provided that the chain elements are movable about horizontal axes, and each holder comprises two angled holder walls the upper and lower edges of which define the height of the holder and are disposed at the same side of said horizontal axes.

In accordance with a further feature of the invention, provision may be made, in this instance, for a pusher which is mounted for driven movement transversely of the direction of travel of the conveyor, to shift the packages from between the wall parts arrested at the aforesaid position along the path of travel of the chain, said holder wall parts being provided with openings for the passage of the pusher.

Figure 2:
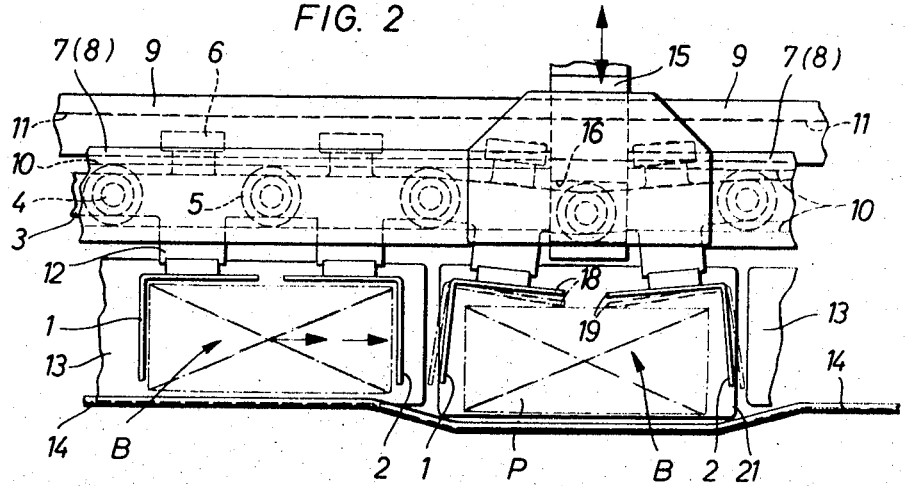
Figure 3:
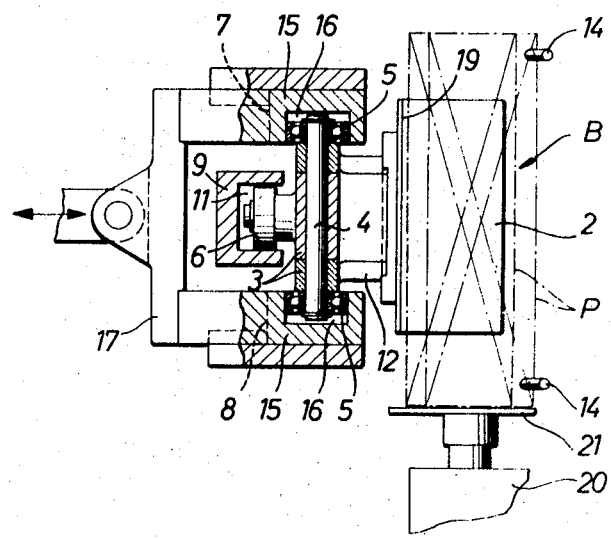
Figure 4:
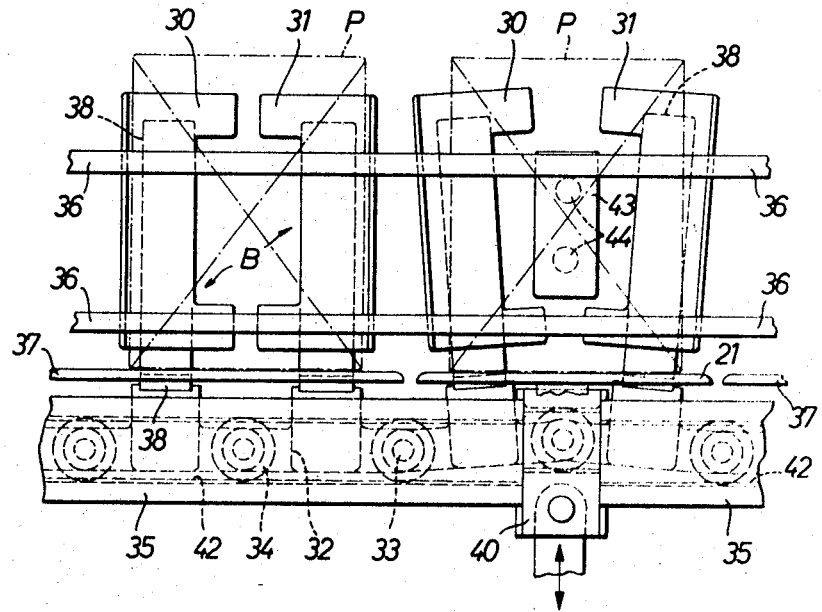
Figure 5:
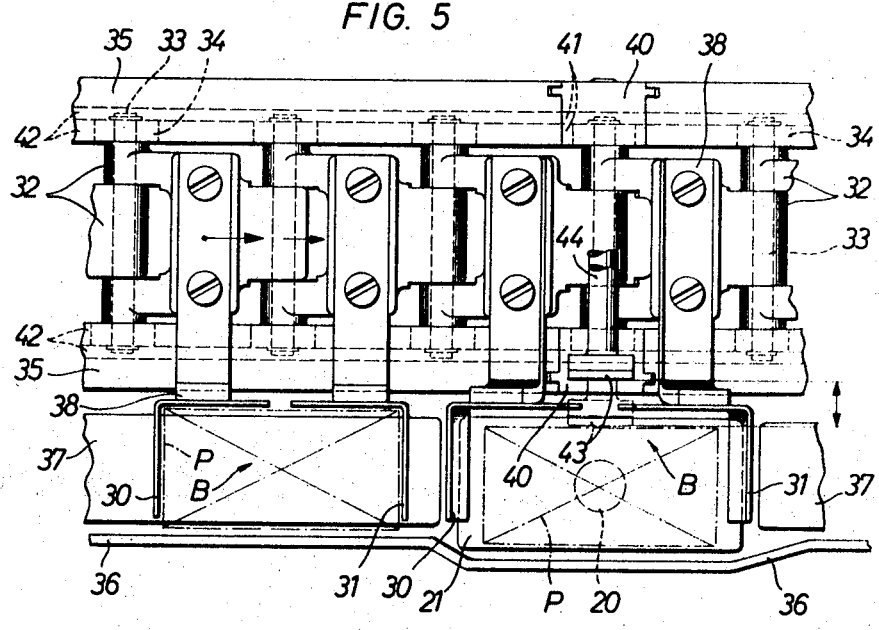
Figure 6:
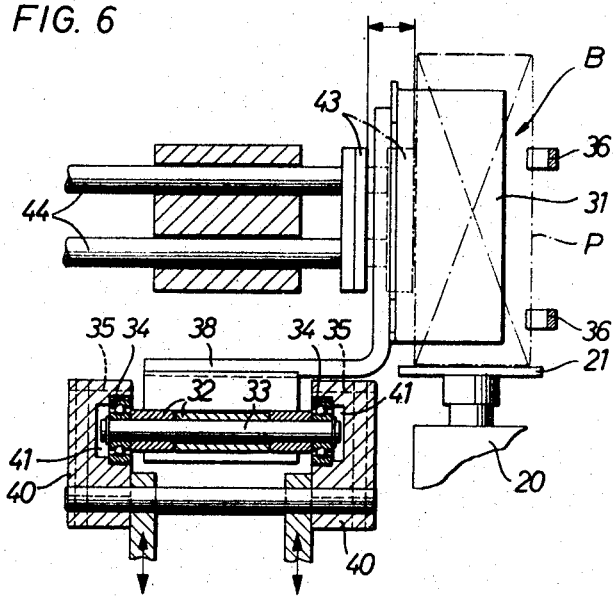
Figure 7:
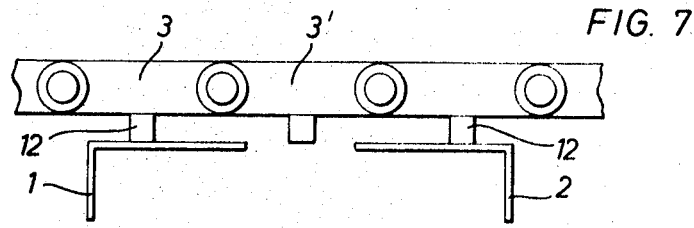
Figure 8:
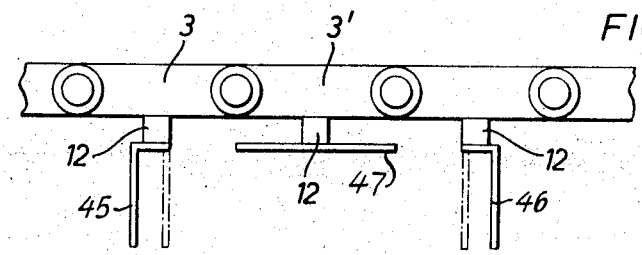

Several embodiments of the conveyor device according to the invention are described below with reference to the accompanying diagrammatic drawings, in which:

FIGURE 1 is a front view of part of a first embodiment of the conveyor device according to the invention, this being shown partly in section, FIGURE 2 is a plan view of the part of the conveyor device illustrated in FIGURE 1, FIGURE 3 shows a detail of the conveyor device of FIGURE 1, as seen from the direction of travel of the conveyor device and partly in section, FIGURE 4 is a front view of part of a second embodiment of the conveyor device according to the invention, FIGURE 5 is a plan view of the part of the conveyor device illustrated in FIGURE 4, FIGURE 6 shows a detail, partly in section, of the conveyor device illustrated in FIGURES 4 and 5, this being viewed from the direction of travel of the conveyor device, FIGURE 7 is a detail, in plan, of a modification of the arrangement seen in FIGURE 2, and FIGURE 8 is a similar plan view of another modification of FIGURE 2.

The embodiment of the conveyor device illustrated in FIGURES 1, 2 and 3 comprises holder walls 1 and 2, chain elements 3, hinge pins 4, rollers 5, 6 and guide rails 7, 8 and 9.

The individual chain elements 3 are hingedly connected together by the pins 4. These pins 4 are arranged upright and at their ends carry the rollers 5 which engage, in known fashion, in grooves 10 in the horizontal guide rails 7, 8, which are arranged one above the other. The chain elements 3 are guided and supported in the vertical direction by the rollers 6 engaging in a groove 11 in the fixed, and likewise horizontal, guide rails 9.

The chain elements 3 have projections 12 with the holder walls 1, 2, which are of angled form, attached thereto in known fashion.

The chain composed of a multiplicity of chain elements 3 is intermittently driven by known means to advance the packages P through the agency of the holders comprised of walls 1, 2. These packages P are supported by a slide plate 13 which extends along the path of travel of the chain, and are precluded from slipping out of the sides of the holders by guide bars 14.

The guide rails 7 and 8 have interruptions in which slide elements 15 are displaceably mounted and guided, these elements 15 having recesses 16 of a shape corresponding to that of the grooves 10 in the guide rails. One roller 5 is located in one such recess 16 each time the chain stops. The slide elements 15, which are connected together by a yoke 17, may be driven, for example by a cam plate drive (not shown), to deflect the elements 3 of the conveyor chain, which are coupled to the rollers 5 accommodated in recesses 16 through a common pin 4, so as to pivot apart two walls 1, 2 constituting a holder B and enclosing a package P. When the walls 1, 2 of the holder hinge in this way, their edges 18, 19 push the corresponding package so that the latter is displaced horizontally from the guide rails 7, 8, 9 transversely to the direction of travel of the conveyor.

Immediately thereafter the sliding elements 15 are retracted through a part of their stroke, the edges 18, 19 of the holder walls 1, 2 are released from the package P, and the package is free all around and is no longer contacted by any part of the holder walls 1, 2, so that it can, for instance be weighed by means of a weighing device 20 which is provided for this purpose. The table 21 of the device 20 is preferably arranged at the level of sliding plate 13. The guide bars 14 are at a greater spacing from the guide rails 7, 8 in the vicinity of the weighing table 21, whereby the package is also free from contact with any sliding guide or the like at this part.

After the weighing has been performed, and before the conveyor is advanced through its next step, the sliding elements 15 are returned to their starting positions whereby the rollers 5 of the chain elements 3 are brought back into alignment with the grooves 10 of the guide rails 7, 8. As a result the holder walls 1, 2 are pivoted back against the package P, and the next step in the conveyor travel can commence. During its further travel the weighed package P is pressed back into the holder B by means of the guide bars 14.

In the second embodiment of the conveyor device of this invention, illustrated in FIGURES 4, 5 and 6, use is again made of holder walls 30, 31 which are associated with one another in pairs and are again of angled form, chain elements 32 which are coupled together by pins 33, rollers 34 provided at the ends of these pins 33, guide rails 35, guide bars 36 for the packages P and a sliding plate 37 for supporting the packages P.

The guide rails 35 run horizontally and are fixedly mounted so as to extend parallel with one another at the same level, whereby the pins 33 connecting the individual chain elements 32 together are guided horizontally by means of the rollers 34. Secured to the chain elements 32 are carrier brackets 38 of cranked form. The angled holder walls 30, 31 are attached to the two limbs of the carrier 38, and these walls are associated together in pairs and embrace the packages P to be transported. Once again the packages are supported by slide plates 37 and are contacted at the open side of the holders B by guide rails 36.

The guide rails 35 are interrupted, for example in the vicinity of a control weigher 20, and the packages P are pushed successively and stepwise on to the weighing table 21 of this weigher. Sliding blocks 40 are arranged in the gaps between the guide rails 35 so as to be vertically displaceable, these blocks having recesses 41 of a cross section corresponding to that of grooves 42 formed in the guide rails 35. The guide blocks 40 are arranged to be driven in unison.

During each arrest of the chain elements 32, which again are advanced stepwise in known fashion, the guide blocks 40 are lifted and as a result pivot two adjacent chain elements 32 in opposite rotational senses, and this through the agency of rollers 34 and pins 33. The holder walls 30, 31 connected to these chain elements 32 pivot away from the package walls in, or oppositely to, the direction of travel, because the pivotal center of the chain elements 32 is disposed above the upper surface of the weighing table 21 which supports the packages P.

Provided above the guide rails 35 in the vicinity of the sliding blocks 40 is a pusher 43 which can be moved between the holder walls 30, 31 towards a package P embraced by the latter. This pusher 43 is moved against the package P during the pivoting apart of the associated holder walls 30, 31 and as a result the pusher 43 moves this package a small amount transversely to the direction of travel so that the wall of the package nearest the pusher 43 is freed from the adjacent holder walls 30, 31. Thereafter the pusher 43 is retracted to its starting position and the weighing procedure can commence.

The guide bars 36 are spaced from the guide rails 35 in the vicinity of the weighing table by an amount such that space is left between a package P and the guide bars 36 even after the transverse shifting of this package, and thus the bars 36 do not make any sliding contact with the package which might interfere with the weighing operation. The pusher 43 may be guided for example by two parallel rods 44 and operated by an eccentric drive (not shown).

After the weighing operation, the slide blocks 40 are lowered; as a result the holder walls 30, 31 swing back to their starting positions and engage the weighed package P, and the latter is transferred downwards from the weighing table 21 on to a further sliding plate 37 during the next step in the conveyor travel. The guide bars 36 which, as already described, are at a greater spacing from the conveyor walls 30, 31 in the vicinity of the weighing table 21, approach each other again during the ensuing length of the conveyor, this causing the package to be displaced into the holder.

In the two embodiments which are described above the holder walls which are associated together to constitute a holder are carried and pivoted by pairs of directly-adjacent chain elements. This arrangements is, however, not limitative of the invention and it is possible within the scope of the latter to have one or more elements which do not carry holder walls arranged between the pair carrying the wall components which cooperate to constitute a holder. An example of this is diagrammatically depicted in FIGURE 7 where the chain elements 3, which carry the cooperating holder wall components 1, 2, are separated by an "empty" element 3'. This increases the effective capacity of the holders.

A further modification of the device, within the scope of this invention, lies in the arrangement, where use is made of a conveyor chain with members which move about vertical axes, in which each holder comprises three substantially flat wall parts arranged in U formation and each secured to a chain element. FIGURE 8 diagrammatically portrays an arrangement of this kind. In this instance, the chain elements are arranged in sets of three per holder. The outer elements 3 of each set carry holder wall plates 45 and 46 arranged transversely to the direction of travel of the conveyor device, while the intervening element 3' carries the holder wall plate 47 disposed in this direction of travel.

In practice it is possible, using a construction of conveyor device in accordance with this invention, to make substantial savings in technical outlay and in flywheel masses, because there is no need to provide special movable mountings on the chain elements for the holder walls, nor any special locking devices to prevent inadvertent pivoting of these holder walls.

We claim:

1. In a conveyor device for a packaging machine, which device comprises an intermittently movable chain made up of successive elements and equipped with holders for the reception of packages, each holder comprising at least two relatively movable holder wall parts connected to said chain, the improvement wherein each of the relatively movable holder wall parts is rigidly connected to one of the elements of the conveyor chain and an operating device provided at a predetermined position along the path of travel of said chain to deflect from the normal position required for conveyance of the packages selected chain elements disposed between the conveyor wall parts which cooperate to engage a package in said position, during each arrest of the conveyor chain.

2. A conveyor device according to claim 1, in which said operating device comprises blocks in fixed mountings slidable transversely of the direction of travel of the conveyor, said blocks being adapted to engage and deflect said selected chain elements.

3. A conveyor device according to claim 1, in which said chain elements are connected by and relatively pivotable about, vertical hinge pins, and are adapted to be actuated by said operating device so as to be deflected by a predetermined amount and, directly thereafter, to be pivoted back a proportion of the amount by which they had been deflected.

4. A conveyor device according to claim 1, in which each holder comprises two of said holder wall parts of angled formation secured to directly adjoining chain elements.

5. A conveyor device according to claim 1, in which each holder comprises two of said wall parts of angled formation which are coupled to the outer chain elements of a group of three such elements which includes a third and empty member coupled between these two outer elements.

6. A conveyor device according to claim 1, in which each holder comprises three of said wall parts which are flat and arranged in U-formation and each of which is connected to an element of the conveyor chain.

7. A conveyor device according to claim 1, in which said chain elements are hinged about successive horizontal axes in the chain, and in which each holder comprises two of said holder wall parts which are angled and have upper and lower edges defining the height of the holder disposed at the same side of said horizontal axes.

8. A conveyor device according to claim 7, further including a pusher which is mounted for driven movement transversely of the direction of travel of the conveyor, to shift the packages from between the wall parts arrested at the aforesaid position along the path of travel of the chain, said holder wall parts being provided with openings for the passage of the pusher.

References Cited
UNITED STATES PATENTS

| | | | |
|---|---|---|---|
| 2,976,984 | 3/1961 | Moncrieff | 198—179 |
| 3,128,881 | 4/1964 | Kühnle. | |

RICHARD E. AEGERTER, Primary Examiner

U.S. Cl. X.R.

198—179